US008749636B2

(12) United States Patent
Brown (10) Patent No.: US 8,749,636 B2
(45) Date of Patent: Jun. 10, 2014

(54) PASSIVE MULTI-BAND APERTURE FILTERS AND CAMERAS THEREFROM (75) Inventor: Kevin L. Brown, Clermont, FL (US)

(73) Assignee: Lockheed Martin Corporation, Bethesda, MD (US)

(*) Notice: Subject to any disclaimer, the term of this patent is extended or adjusted under 35 U.S.C. 154(b) by 242 days.

(21) Appl. No.: 13/181,019

(22) Filed: Jul. 12, 2011

(65) Prior Publication Data
US 2013/0016220 A1 Jan. 17, 2013

(51) Int. Cl.
H04N 5/33 (2006.01)
F21V 9/04 (2006.01)

(52) U.S. Cl.
USPC ........... 348/164; 348/166; 359/350; 359/359; 359/589; 250/338.1; 250/339.01; 250/339.02; 250/352

(58) Field of Classification Search
USPC .................. 348/164, 166; 359/359, 350, 589; 250/338.1, 339.01, 339.02, 352
See application file for complete search history.

(56) References Cited

U.S. PATENT DOCUMENTS

| 5,373,182 | A  | * | 12/1994 | Norton ........................ 257/440 |
| 6,034,372 | A  | * | 3/2000 | LeVan ........................... 250/352 |
| 7,045,052 | B2 | * | 5/2006 | Kochergin et al. ............ 205/656 |
| 7,609,381 | B2 | * | 10/2009 | Warren ........................ 356/328 |
| 7,655,911 | B2 | * | 2/2010 | Murphy et al. .............. 250/352 |
| 2006/0255275 | A1 | | 11/2006 | Garman et al. |

OTHER PUBLICATIONS

D.F. King, et al., "3rd Generation 1280×720 FPA Development Status at Raytheon Vision Systems", Raytheon Vision Systems, Goleta, CA 93117 and HRL Laboratories, LLC, Malibu, CA 90265, Proc. of SPIE vol. 6206, 62060W (2006).
Nahum Gat, et al., "Variable Cold Stop for Matching IR Cameras to Multiple f-number Optics", Opto-Knowledge Systems, Inc., Torrance, CA 90502 and US Army WSMR, White Sands Missile Range, New Mexico 88002, Society of Photo-Optical Instrumentation Engineers, 2007, SPIE Proceedings 6542, Infrared Technology and Applications, XXXIII, Defense & Security Symposium, Orlando, FL.

* cited by examiner

Primary Examiner — Christopher S Kelley
Assistant Examiner — Zhihan Zhou
(74) Attorney, Agent, or Firm — Terry M. Sanks, Esq.; Beusse Wolter Sanks Mora & Maire, P.A.

(57) ABSTRACT

A multi-band aperture filter for optically coupling to a focal plane array (FPA) of a camera includes a substrate, and a first spectral coating on a first surface of the substrate that passes both a first longer and a second shorter wavelength band. A second spectral coating that passes the longer wavelength band and blocks the shorter wavelength band is on an outer annulus region, but not on an inner region on the first surface or a second surface of the substrate. The second spectral coating provides a larger aperture area for the longer wavelength band as compared to an aperture area for the shorter wavelength band to passively realize different F-numbers for the bands to provide substantially matched beam spot sizes on the detector array for the longer wavelength band and the shorter wavelength band, such as a long-wave infrared (LWIR) band and a mid-wave IR (MWIR) band.

8 Claims, 7 Drawing Sheets

PASSIVE MULTI-BAND APERTURE FILTERS AND CAMERAS THEREFROM

FIELD

Disclosed embodiments relate to multi-band spectral filters, and more particularly to aperture filters that provide multiple pass bands and multiple F-numbers for cameras, and multi-band cameras therefrom.

BACKGROUND

Imaging systems that image both mid-wave infrared (MWIR (3 µm to 5 µm)) and long-wave infrared (LWIR (8 µm to 12 µm)) enable improved imaging for a variety of applications, including military and certain commercial applications. An aperture filter that provides dual pass bands and dual F-numbers together with a dual-band focal plane array (FPA) photodetector can simultaneously have high detection efficiency in both the MWIR and LWIR and thus provide the basis for imaging systems that generate images which include image data from both of these bands. Current high-performance MWIR/LWIR sensors require cryogenic cooling of the detector and limiting aperture to limit dark current and its associated noise, and a spectral filter to limit the background radiation reaching the FPA. Included are cold shield apertures within a cryogenically cooled dewar to limit received background radiation. The cold shield aperture also defines an effective F-number for the imaging system.

The F-number of the cold shield aperture is defined as the ratio of the distance (d) from the cold shield aperture to the focal plane of the FPA to the diameter (D) of the cold shield aperture. Due to wavelength differences between the bands, different F-numbers are needed to provide the same beam spot size on the FPA to achieve high image resolution for both the MWIR and LWIR bands. Thus, an important attribute for advanced MWIR/LWIR cameras is the incorporation of an in-dewar mechanism to permit the cold shield aperture to be varied in size (e.g. diameter) between two (or more) predetermined size settings while maintaining near-100% shielding efficiency, as the system's F-number is varied to optimize performance in each band.

Conventional approaches for varying the F-number generally employ mechanical iris configurations that are either external or internal to the dewar that provide a first F-number during certain time instants for imaging one band, and a different F-number during other time instants to image the other band. Such mechanical approaches generally require complicated control electronics to implement the mechanical switching, are costly in terms of initial development and added per unit cost, decrease reliability, have inherent repeatability issues, and add thermal mass, which adds heat load to the imaging system that results in a requirement for higher capacity coolers. Moreover, such approaches do not provide temporally simultaneous imaging of the respective bands.

SUMMARY

A multi-band aperture filter for optically coupling to a focal plane array (FPA) of a camera includes a substrate, and a first spectral coating on a first surface of the substrate that passes both a first longer wavelength band and a second shorter wavelength band. A second spectral coating that passes the longer wavelength band and blocks the shorter wavelength band is on an outer annulus region, but not on an inner region on the first surface or a second surface of the substrate. The second spectral coating provides a larger aperture area for the longer wavelength band as compared to an aperture area for the shorter wavelength band to passively realize different F-numbers for the respective bands to provide substantially matched beam spot sizes on the FPA for the longer wavelength band light and the shorter wavelength band light, such as long-wave infrared (LWIR, 8 µm to 12 µm) band light and mid-wave IR (MWIR, 3 µm to 5 µm) band light.

Another disclosed embodiment is a multi-band IR camera that comprises a dewar housing including a cold shield aperture framed by a dewar cold shield, and a disclosed multi-band aperture filter over the cold shield aperture. The IR camera includes a multi-band FPA optically coupled to the aperture filter. Disclosed IR cameras are passive arrangements that simultaneously provide at least two different F-number limiting apertures within the cold space of the cryogenic dewar, in contrast to conventional mechanical iris configurations described above needed for realizing different F-number limiting apertures within the cold space of the cryogenic dewar. A significant advantage for disclosed embodiments is that there are no moving parts (entirely passive), no electronics, no timing, are inherently simultaneous, reliable, and are provided at a low cost since only spectral filter coatings on the cold filter substrate are needed to implement multi-band operation.

DETAILED DESCRIPTION

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Figure 1A:
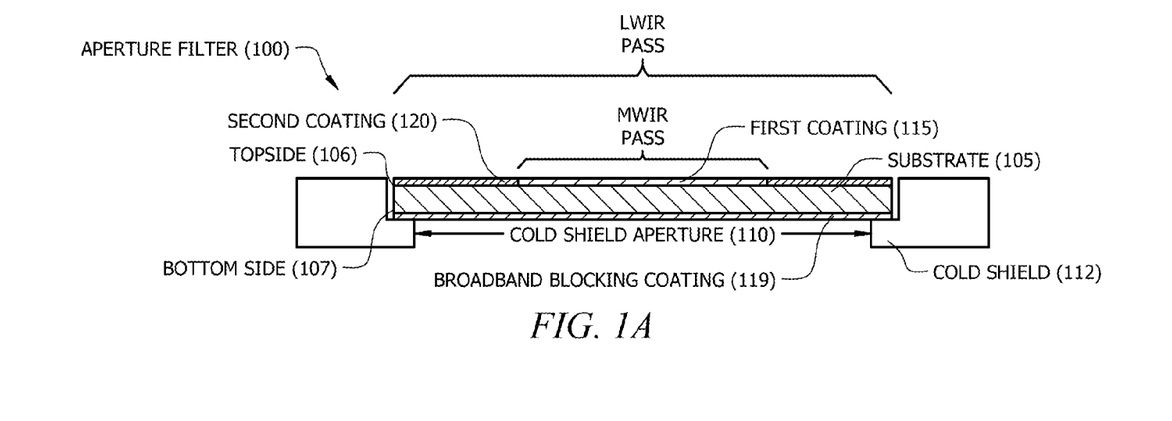
FIG. 1A is a cross sectional depiction of an example dual-band aperture filter on a cold shield aperture that has a first spectral coating and second spectral coating on the same side of the substrate, according to an example embodiment.

FIG. 1A is a cross sectional depiction of an example dual-band aperture filter 100 (hereafter "aperture filter 100") on a cold shield aperture 110 of a cold shield 112 for optically coupling to a FPA of a camera, according to an example embodiment. Aperture filter 100 includes a first spectral coating 115 (hereafter "first coating 115") and second spectral coating 120 (hereafter "second coating 120") both shown on a topside surface 106 of a substrate 105. Substrate 105 also includes a bottomside surface 107. Substrate 105 can comprise materials such as silicon or germanium for MWIR/LWIR imaging applications.

The first spectral coating 115 has a passband that includes a first longer wavelength band and a second shorter wavelength band, shown as LWIR and MWIR, respectively. Aperture filter 100 is shown also including a broadband blocking coating 119 on the entire surface area of bottomside 107 to limit overall broadband transmission that can instead be applied to the entire topside 106. For MWIR/LWIR imaging applications, broadband blocking coating 119 blocks wavelengths that the FPA is sensitive to other than MWIR and LWIR, for example, 1 µm to 3 µm, 5 µm to 8 µm, and 12 µm to 15 µm for MWIR/LWIR imaging applications. In another embodiment, described below relative to FIG. 1B, instead of a broadband blocking coating 119, the first coating 115 can also provide a stopband that blocks other wavelengths that the FPA is sensitive to (e.g., 1 µm to 3 µm, 5 to 8 µm, and 12 to 15 µm for MWIR/LWIR imaging applications).

As described in the Examples section below, one implementation approach uses respective coatings comprising a plurality of alternating ZnSe and ThF$_4$ thin films, where the respective region coatings differ only in layer thicknesses and number of layers. It is noted that coating solutions to obtain desired spectral characteristics for the respective coatings represent one in a large family of solutions that can be compared for appropriate selection based on characteristics such as spectral performance, efficacy, durability, and cost.

The second coating 120 has a passband that includes the longer wavelength band shown as LWIR and a stopband that blocks the shorter wavelength band shown as MWIR. The second coating 120 is shown on an outer annulus region but not on an inner region of the topside surface 106 of substrate 105. Since the first coating 115 and second coating 120 both pass the longer wavelength band (e.g., LWIR), aperture filter 100 passively provides a larger aperture area for the longer wavelength band (e.g., LWIR) as compared to an aperture area for the shorter wavelength band (e.g., MWIR).

Accordingly, selective shorter wavelength band blocking provided by the second coating 120 provides a reduced filter area utilized for the shorter wavelength band which can be recognized to simultaneously provide a higher F-number for transmitted shorter wavelength (e.g., MWIR) band light as compared to the lower F-number for transmitted longer wavelength (e.g., LWIR) band light resulting from the full filter area being utilized by the longer wavelength band light. The respective aperture filter areas can be designed to realize F-numbers for the respective bands to provide substantially matched beam spot sizes on the FPA for the longer wavelength band light and the shorter wavelength band light.

Figure 1B:
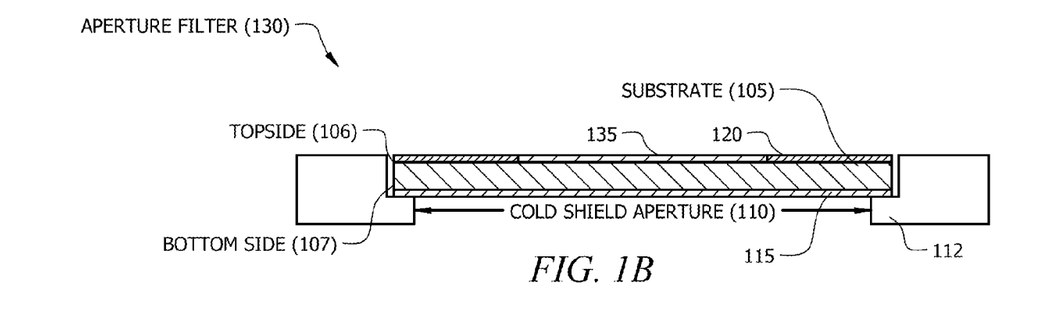
FIG. 1B is a cross sectional depiction of another example dual-band aperture filter on a cold shield aperture that has the first spectral coating and second spectral coating on opposite sides of the substrate, that also includes a phase matching coating, according to an example embodiment.

FIG. 1B is a cross sectional depiction of another example dual-band aperture filter 130 on a cold shield aperture 110 of a cold shield 112 that has the first coating 115 and the second coating 120 on opposite sides of the substrate 105, that also includes a phase matching coating 135, according to an example embodiment. In the embodiment shown in FIG. 1B the first coating 115 is on the full area on the bottomside 107 of substrate 105, with the second coating 120 only on an outer annulus region of the topside 106 of the substrate 105, along with a phase matching coating 135 on an inner region of the topside 106 of the substrate 105. In this embodiment, the first coating 115 also provides the broadband blocking function by providing a stopband that blocks other wavelengths that the FPA is sensitive to (e.g., 1 µm to 3 µm, 5 to 8 µm, and 12 to 15 µm for MWIR/LWIR imaging applications).

Phase matching coating 135 helps reduce the relative phase of the s and p polarization components of the transmitted light to a low enough value to not impair the Modulation Transfer Function (MTF) of the imaging system. As known in optics, the MTF describes how the contrast of the image varies with the spatial frequency of the image content. In one example embodiment the phase matching coating 135 comprises a stack of alternating layers of ThF$_4$ and ZnSe. The phase matching coating 135 passes both bands (e.g., MWIR band and said LWIR band), has in transmittance in the longer band (e.g. LWIR band) substantially the same optical path length defined herein as being less than ¼ wavelength different as a function of both wavelength and angle of incidence as the second coating 120.

Figure 1C:
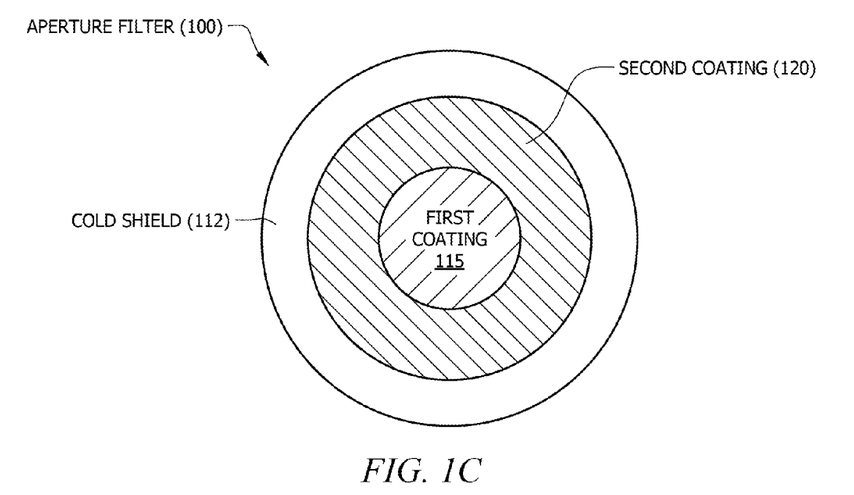
FIG. 1C is a top view depiction of the circular, concentric dual-band aperture filter on a cold shield aperture depicted in FIG. 1A.

FIG. 1C is a top view depiction of the dual-band aperture filter 100 on a cold shield aperture depicted in FIG. 1A. The first coating 115 and the second coating 120 can be seen to both be circular in shape and concentric to one another.

Figure 1D:
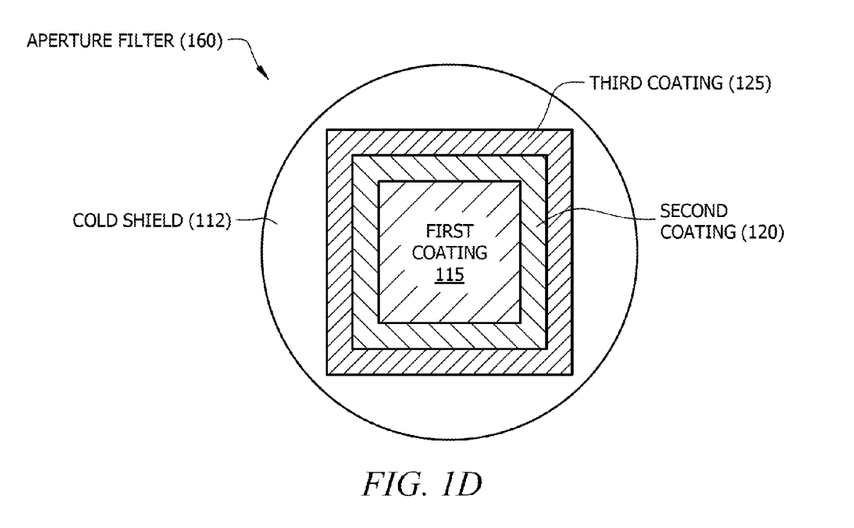
FIG. 1D is a top view depiction of an example square tri-band aperture filter on a cold shield aperture, according to an example embodiment.

FIG. 1D is a top view depiction of an example tri-band aperture filter 160 on a cold shield aperture, according to an example embodiment. Aperture filter 160 includes third coating 125 that is outside the second coating 120 that is outside first spectral coating 115. The third spectral coating 125 passes all three bands including a lowest, middle and longest wavelength band, the second coating 120 only passes the lowest and the middle wavelength band, and the first coating 115 only passes the lowest wavelength band. FIG. 1D which shows square shaped coatings demonstrates that disclosed aperture filter coatings can be embodied in shapes other than round. Other shapes are possible, including, but not limited to, rectangular, square with rounded corners, elliptical, or any partial geometrical shape or combination of shapes. Moreover, concentric arrangements although generally helpful to maintain concentricity of the optical bundles, are not required.

Figure 2:
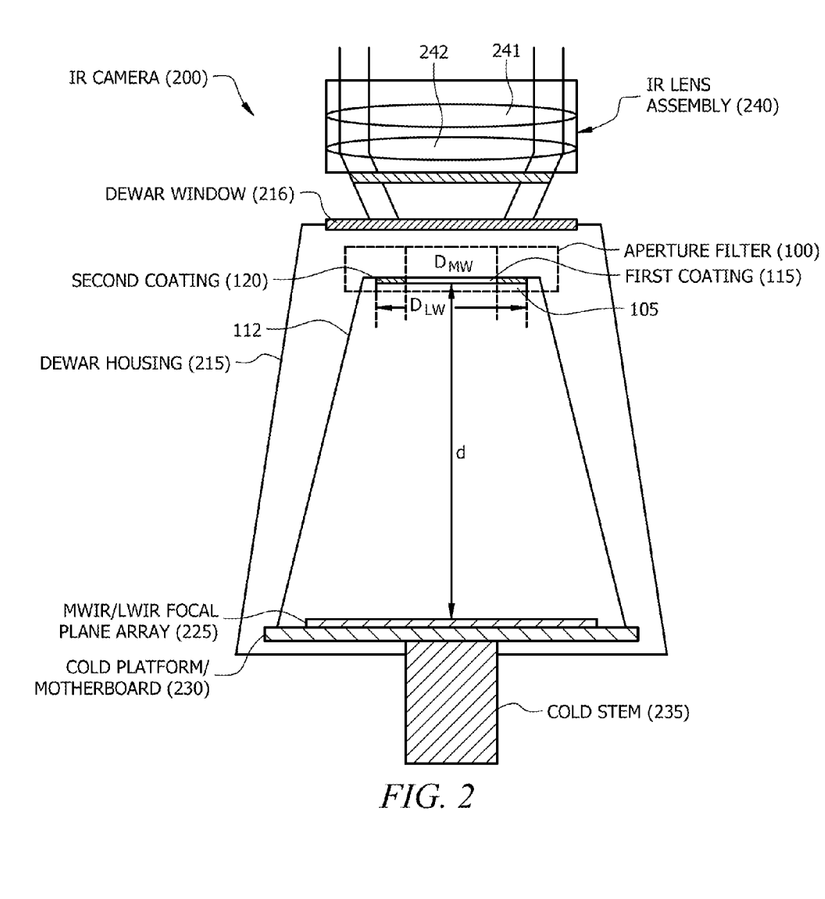
FIG. 2 is a side sectional depiction of an infrared camera including the example dual-band aperture filter on cold shield aperture shown in FIG. 1A.

FIG. 2 is a side sectional depiction of a multi-band IR camera 200 including the example dual-band aperture filter 100 shown in FIG. 1A. IR camera 200 includes an IR lens assembly 240 comprising lenses shown as 241 and 242, an outer dewar housing 215 including a dewar window 216 having components inside including aperture filter 100 comprising a cold shield aperture framed by a dewar cold shield 112, and a multi-band FPA 225 optically coupled to the aperture filter 100.

FPA 225 is shown on a cold platform/motherboard 230 that is thermally coupled to the cold stem 235 shown for maintaining the FPA 225 at a cold temperature that is at or below the maximum temperature allowed for a given imaging application. A vacuum connection to a vacuum source for evacuating the volume within dewar housing 215 is not shown, but is generally provided. The respective F-numbers can be seen to be simultaneously and passively provided by aperture filter 100 comprising $d/D_{LW}$ and for the longer wavelength band and $d/D_{MW}$ for the shorter wavelength band, where d is distance from the cold shield aperture to the focal plane of the FPA 225, and Dx is the aperture diameter (or effective diameter if not circular). If not circular, one calculation approach is to determine the effective diameter of the aperture if it were circular. However, in some cases, such as a rectangular aperture, the F-number might be determined by both dimensions of the aperture, so that there could be different F-numbers for each dimension (vertical and horizontal) of the cold shield aperture.

The FPA 225 comprises a multi-band FPA that typically comprises multiple detector elements with different spectral responsivities, such as stacked on top of each other to be spatially aligned and registered such that they sense the same focus image. At the point of order overlap, each band will only respond to the incident light in their band. This also solves the spatial co-registration problem, because the two arrays of "monoband" pixels are stacked on top of each other. Dual-band FPAs have been realized in various "waveband pairs", including MWIR-LWIR. Unlike conventional single waveband FPAs, each pixel is a site for dualband (or more generally multi-band) detection. The shorter waveband material absorbs shorter wavelength photons, and transmits longer wavelength photons to the (deeper) longer waveband layer. Typically, the photocurrent for each waveband is injected separately into the detector multiplexer circuit, and integrated at a separate charge storage site within the multiplexer. Dual-band FPAs are known for both "simultaneous" operation, for which both photocurrents are integrated during the same frame time and typically over at least part of the same integration time, and "sequential" operation, for which one waveband is integrated during one frame time, the other waveband during the next frame time. In the case of sequential operation, the frames of data from the FPA are typically "waveband interlaced".

Figure 3A:
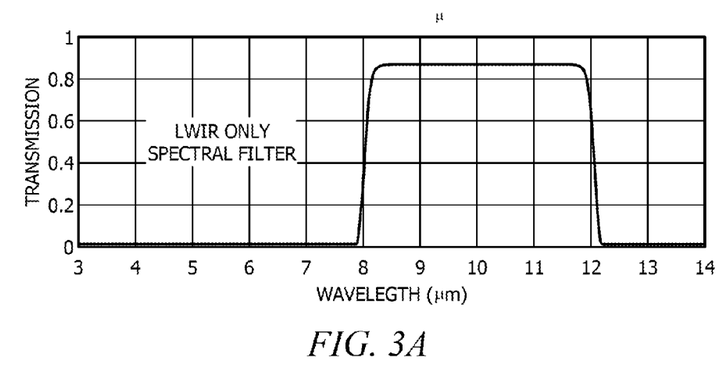
FIG. 3A is the spectral response showing the transmission characteristics of a spectral coating that transmits only LWIR, according to an example embodiment.
Figure 3B:
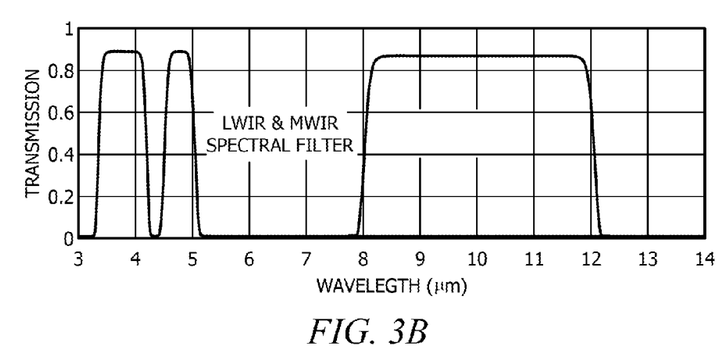
FIG. 3B is the spectral response showing the transmission characteristics of a spectral coating that transmits both MWIR and LWIR, according to an example embodiment.

FIG. 3A is an example spectral response of a spectral coating that transmits LWIR but not MWIR, such as second coating 120 described above, according to an example embodiment. A substrate material such as germanium, ZnSe, InP, GaAs with appropriate thin film filter layers can provide a spectral response that resembles that shown in FIG. 3A (e.g., see Examples section, FIG. 4B). FIG. 3B is the spectral response of a spectral coating that transmits MWIR and LWIR such as first coating 115 described above, according to an example embodiment. A material such as CdS, ZnS, ZnSe, GaAs with appropriate thin film filter layers can provide a spectral response that resembles that shown in FIG. 3B (e.g., see Examples section, FIG. 4C).

EXAMPLES

Disclosed embodiments are further illustrated by the following specific Examples, which should not be construed as limiting the scope or content of this Disclosure in any way.

An particular example aperture filter design for a MWIR/LWIR imaging system is now described. Germanium was used as the broadband substrate. Germanium transmits both the MWIR band and the LWIR band. The design included a broadband blocking coating, described above as first coating 115, LWIR and MWIR pass coating described above as phase matching coating 135, and LWIR pass/MWIR blocking coating described above as second coating 120. The result is that the outer annulus region passes only one band (e.g., LWIR) and the inner region passes both bands (e.g., LWIR and MWIR). In this example, the respective coatings each comprised different stacks of alternating layers of $ThF_4$ and ZnSe. Such coatings may be applied using traditional thin film techniques.

Figure 4A:
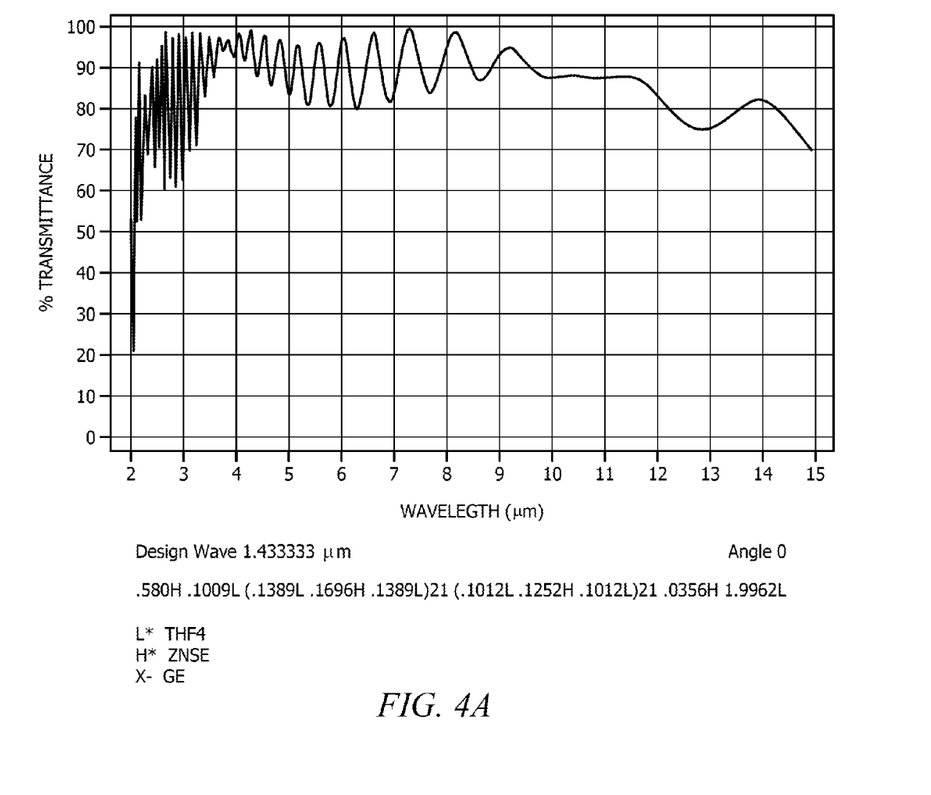
FIGS. 4A-C show simulated spectral response and coating stack specifics for an example broadband blocking coating, example LWIR pass/MWIR blocking coating, and example LWIR and MWIR pass coating, respectively.
Figure 4B:
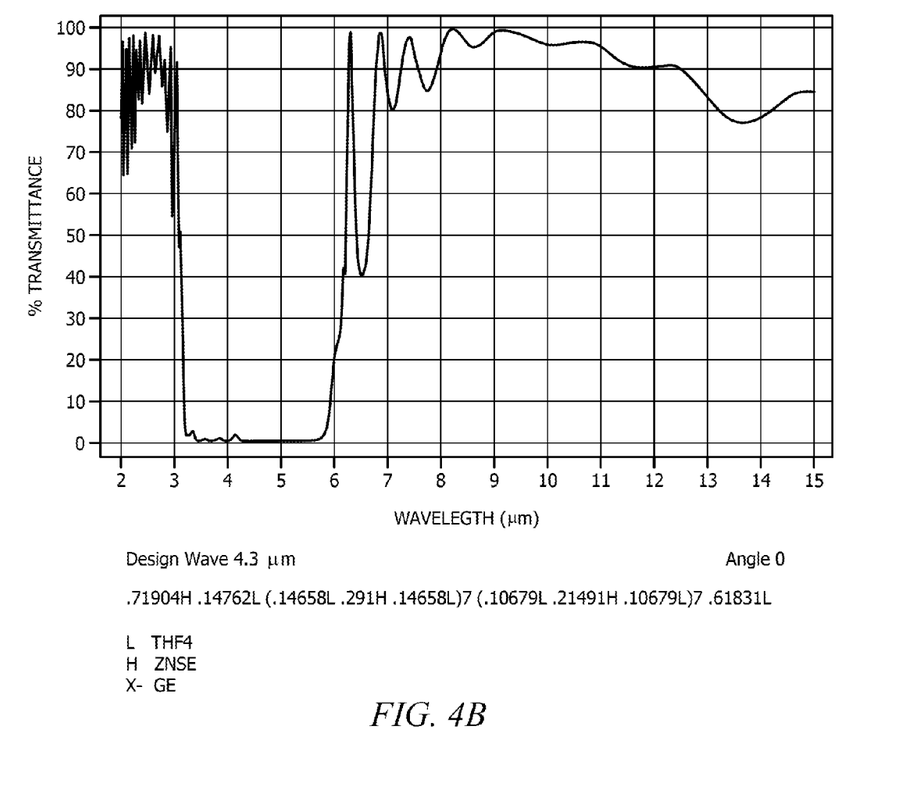
Figure 4C:
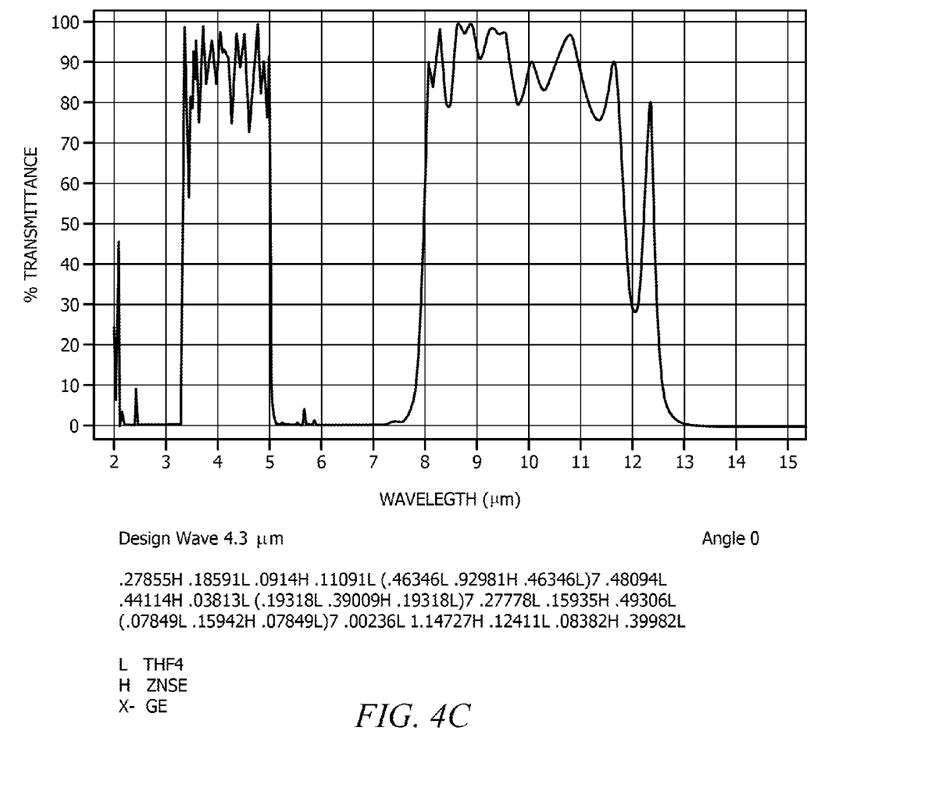

FIGS. 4A-C show simulated spectral responses and coating stack specifics for an example broadband blocking coating, example LWIR pass and MWIR blocking coating, and example LWIR and MWIR pass coating, respectively. H stands for ZnSe, L stands for $ThF_4$, and the respective layer thicknesses can be found by multiplying the numbers shown by the wavelength of the design (reference wavelength) indicated. For example, 0.27855 H in FIG. 4A represents a ZnSe layer 1.197 μm thick (4.3 μm×0.27855). Parentheticals represent multiple repetitions of the content of the parenthetical, such as 7 repetitions of the film stack 0.46346 L 0.92981 H 0.46346 L represented in FIG. 4A by (0.46346 L 0.92981 H 0.46346 L)7.

The broadband blocking coating can be applied the whole area of one side of the substrate (referred to as side 1) of the aperture filter. This coating having the transmission characteristics shown in FIG. 4A defines the MW and LW passbands for the whole filter. FIG. 4B shows the spectral response of the LWIR pass and MWIR blocking coating and coating stack specifics that can be applied to the other side (side 2) of the aperture filter in the outer region (outer annulus region) only, which can be seen to pass the LWIR and block MWIR. FIG. 4C shows the spectral response for the LWIR and MWIR pass spectral coating (broad passband) coating and coating stack specifics that can also be applied to side 2 in only the inner region and that provides the phase matching for the inner region relative to the outer region.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure.

Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The terminology used herein is for the purpose of describing particular embodiments only and is not intended to be limiting to this Disclosure. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

I claim:

1. A multi-band aperture filter for optically coupling to a focal plane array (FPA) of a camera, comprising:
   a substrate;
   a first spectral coating disposed on a first surface of said substrate, the first spectral coating arranged to pass a first longer wavelength band and a second shorter wavelength band;
   a phase matching coating disposed on a second surface of said substrate, the first and second surfaces of said substrate being mutually opposed to one another, wherein the phase matching coating is arranged to provide a reduction in a relative phase relationship between S and P polarization components of light passing through the phase matching coating; and
   a second spectral coating arranged to pass said longer wavelength band and block said shorter wavelength band, the second spectral coating disposed on the second surface of said substrate, wherein said second coating provides a larger aperture area for said longer wavelength band relative to an aperture area for said shorter wavelength band,
   wherein the phase matching coating comprises an inner annulus region on the first surface of said substrate relative to an outer annulus region defined by the first spectral coating on the first surface of said substrate.

2. The multi-band aperture filter of claim 1, wherein the first spectral coating comprises a broadband blocking coating configured to block wavelengths other than said first longer wavelength band and said second shorter wavelength band that said FPA is sensitive to.

3. The aperture filter of claim 1, wherein said longer wavelength band comprises a first infrared (IR) band and said shorter wavelength band comprises a second infrared (IR) band.

4. The aperture filter of claim 3, wherein said first IR band comprises a long-wave IR (LWIR) band and said second infrared band comprises a mid-wave IR (MWIR) band.

5. The aperture filter of claim 4, further comprising a phase matching coating selectively on said inner region, wherein said phase matching coating passes both said MWIR band and said LWIR band, has in transmittance in said LWIR band substantially the same optical path length as a function of both wavelength and angle of incidence as said second spectral coating.

6. The aperture filter of claim 1, wherein said second spectral coating is on said second surface of said substrate, wherein said first and said second spectral coating are on opposite sides of said substrate.

7. The aperture filter of claim 1, wherein said first spectral coating provides a stopband that blocks wavelengths other than said first longer wavelength band and said second shorter wavelength band that said FPA is sensitive to.

8. The aperture filter of claim 1, wherein said first spectral coating and said second spectral coating are concentric to one another.

* * * * *